United States Patent
Zou

(10) Patent No.: US 11,113,226 B2
(45) Date of Patent: Sep. 7, 2021

(54) FIRMWARE BURNING APPARATUS AND SYSTEM

(71) Applicant: SHENZHEN GOODIX TECHNOLOGY CO., LTD., Shenzhen (CN)

(72) Inventor: Nan Zou, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/830,545

(22) Filed: Mar. 26, 2020

(65) Prior Publication Data

US 2021/0064560 A1 Mar. 4, 2021

(30) Foreign Application Priority Data

Aug. 30, 2019 (CN) .......................... 201910816949.1

(51) Int. Cl.
*G06F 13/40* (2006.01)
*G06F 8/61* (2018.01)

(52) U.S. Cl.
CPC ............ *G06F 13/4068* (2013.01); *G06F 8/63* (2013.01)

(58) Field of Classification Search
CPC ............................... G06F 8/63; G06F 13/4068
See application file for complete search history.

(56) References Cited

U.S. PATENT DOCUMENTS

| 10,394,542 | B1* | 8/2019 | Poenaru | G06F 3/065 |
| 2004/0068721 | A1* | 4/2004 | O'Neill | G06F 8/65 |
| | | | | 717/168 |

(Continued)

FOREIGN PATENT DOCUMENTS

| CN | 105679366 A | 6/2016 |
| CN | 205302955 U | 6/2016 |

(Continued)

OTHER PUBLICATIONS

EPO machine translation WO2018157588 A1 description (Year: 2018).*

(Continued)

*Primary Examiner* — Glenn A. Auve
(74) *Attorney, Agent, or Firm* — Brion Raffoul

(57) ABSTRACT

Embodiments of the present disclosure provide a burning apparatus and system. The burning apparatus includes: a processor, a wireless communication module, at least one peripheral interface, and a memory; the processor is electrically connected to the wireless communication module, the peripheral interface, and the memory, respectively; the memory is configured to store to-be-burned firmware and a system program required for operating the burning apparatus; the processor is configured to start the system program to control the wireless communication module to be wirelessly connected to a terminal device, and receive, through the wireless communication module, the to-be-burned firmware transmitted by the terminal device; and the processor is also configured to be electrically connected to at least one target board through the at least one peripheral interface, and write the to-be-burned firmware to the at least one target board through the at least one peripheral interface.

13 Claims, 4 Drawing Sheets

(56) References Cited

U.S. PATENT DOCUMENTS

| | | | | |
|---|---|---|---|---|
| 2013/0159986 | A1* | 6/2013 | Tsao | G06F 8/66 |
| | | | | 717/168 |
| 2016/0157093 | A1* | 6/2016 | Jiang | H04W 4/50 |
| | | | | 455/418 |
| 2017/0293484 | A1* | 10/2017 | Haase | H04L 9/14 |
| 2018/0210726 | A1* | 7/2018 | Jun | H04W 4/80 |
| 2020/0104112 | A1* | 4/2020 | Hu | H04L 67/34 |
| 2020/0186987 | A1* | 6/2020 | Choi | G06F 8/65 |

FOREIGN PATENT DOCUMENTS

| | | | | |
|---|---|---|---|---|
| CN | 105760186 | A | | 7/2016 |
| CN | 207164519 | U | | 3/2018 |
| CN | 109271174 | A | * | 1/2019 |
| CN | 208386942 | U | | 1/2019 |
| CN | 105760186 | B | | 6/2019 |
| WO | WO-2018157588 | A1 | * | 9/2018 ............... G06F 8/65 |

OTHER PUBLICATIONS

EPO machine translation CN105679366A description (Year: 2016).*
EPO machine translation CN208386942U description (Year: 2019).*
EPO machine translation CN105760186A description (Year: 2019).*
EPO machine translation CN109271174A description (Year: 2019).*

* cited by examiner

FIRMWARE BURNING APPARATUS AND SYSTEM

CROSS-REFERENCE TO RELATED APPLICATION

This application claims the priority to Chinese Application No. CN201910816949.1, entitled "Burning Apparatus and System" filed on Aug. 30, 2019, the application of which is hereby incorporated by reference in its entirety.

TECHNICAL FIELD

Embodiments of the present disclosure relate to the field of electronic information technology, and in particular, relate to a burning apparatus and system.

BACKGROUND

Firmware refers to a program solidified inside an integrated circuit, and is responsible for controlling and coordinating the functions of the integrated circuit of an electronic device. During the production of an electronic product, firmware burning is usually required. The firmware burning is to download firmware to a target board, and the target board may be an IC (Integrated Circuit) chip, a PCB (Printed Circuit Board), etc. In a related technology, when the firmware burning is performed, a burning apparatus is connected to an upper computer (usually a PC) by a wire, to-be-burned firmware is transmitted from the upper computer to burning firmware, and then the to-be-burned firmware is written to a target board. Because one upper computer can only be connected to one burning apparatus, the production efficiency is low; and because human-computer interaction modules such as a display screen and a touchpad are required, the burning cost is relatively high.

SUMMARY

In view of the above, one of the technical problems to be solved by the embodiments of the present disclosure is to provide a burning apparatus and system for overcoming the above defects.

In a first aspect, an embodiment of the present disclosure provides a burning apparatus, including: a processor, a wireless communication module, at least one peripheral interface, and a memory; the processor is electrically connected to the wireless communication module, the peripheral interface, and the memory, respectively; the memory is configured to store to-be-burned firmware and a system program required for operating the burning apparatus; the processor is configured to start the system program to control the wireless communication module to be wirelessly connected to a terminal device, and receive, through the wireless communication module, the to-be-burned firmware transmitted by the terminal device; and the processor is also configured to be electrically connected to at least one target board through the at least one peripheral interface, and write the to-be-burned firmware to the at least one target board through the at least one peripheral interface.

Optionally, in an embodiment of the present disclosure, the wireless communication module includes a Bluetooth module; and the processor is further configured to be in Bluetooth connection with the terminal device through the Bluetooth module, and receive, through the Bluetooth module, the to-be-burned firmware transmitted by the terminal device.

Optionally, in an embodiment of the present disclosure, the processor is further configured to initialize a BLE (Bluetooth Low Energy) protocol stack by starting the system program to enable BLE broadcasting, and is in Bluetooth connection with the terminal device through the BLE broadcasting.

Optionally, in an embodiment of the present disclosure, the at least one peripheral interface includes at least one of the following interfaces: SWD (Serial Wire Debug) interface, SPI (Serial Peripheral Interface), I2C (Inter-Integrated Circuit) interface, IIS (Integrated Interchip Sound) interface, GPIO (General-Purpose Input/Output) interface, and an interface with PWM (Pulse Width Modulation) capability.

Optionally, in an embodiment of the present disclosure, the at least one peripheral interface includes an SWD, and the processor is also configured to initialize the SWD by starting the system program.

Optionally, in an embodiment of the present disclosure, the processor is also configured to receive, through the wireless communication module, a first part of the to-be-burned firmware transmitted by the terminal device, store the first part of the to-be-burned firmware to the memory, and write the first part of the to-be-burned firmware to the at least one target board through the at least one peripheral interface; and the processor is also configured to delete, after finishing writing the first part of the to-be-burned firmware to the at least one target board, the first part of the to-be-burned firmware, receive, through the wireless communication module, a second part of the to-be-burned firmware transmitted by the terminal device, store the second part of the to-be-burned firmware to the memory, and write the second part of the to-be-burned firmware to the at least one target board through the at least one peripheral interface, till completely writing the to-be-burned firmware to the at least one target board.

Optionally, in an embodiment of the present disclosure, the processor is also configured to receive, through the wireless communication module, a first control instruction transmitted by the terminal device, the first control instruction being used to instruct burning of a first target board; and write, based on the first control instruction, the to-be-burned firmware to the first target board through the peripheral interface connected to the first target board, the first target board belonging to the at least one target board.

Optionally, in an embodiment of the present disclosure, the processor is also configured to receive, through the wireless communication module, a second control instruction transmitted by the terminal device, the second control instruction being used to instruct suspending burning of a second target board; and suspend, based on the second control instruction, writing the to-be-burned firmware to the second target board, the second target board belonging to the at least one target board.

Optionally, in an embodiment of the present disclosure, the processor is also configured to write, when determining the presence of to-be-burned firmware in the memory, the to-be-burned firmware to the at least one target board through the at least one peripheral interface.

Optionally, in an embodiment of the present disclosure, the processor is also configured to close the interface that has completed burning in the at least one peripheral interface.

Optionally, in an embodiment of the present disclosure, the processor is also configured to write, when determining that the at least one peripheral interface is connected to a target board, the to-be-burned firmware to the at least one target board through the at least one peripheral interface, otherwise, wait for connecting to a target board.

In a second aspect, an embodiment of the present disclosure provides a burning system, including: at least one burning apparatus, a terminal device, and at least one target board; the at least one burning apparatus is the burning apparatus described in the first aspect or any embodiment of the first aspect; the terminal device is wirelessly connected to the at least one burning apparatus, and each burning apparatus is connected to at least one target board through at least one peripheral interface; the terminal device is configured to transmit at least one to-be-burned firmware to the at least one burning apparatus; the at least one burning apparatus is configured to receive, through a respective wireless communication module, the to-be-burned firmware transmitted by the terminal device, and the to-be-burned firmware received by the burning apparatus is the same or different; and the at least one burning apparatus is also configured to write the respective received to-be-burned firmware to the respective connected at least one target board through the respective at least one peripheral interface.

Optionally, in an embodiment of the present disclosure, the at least one burning apparatus includes a first burning apparatus; and the first burning apparatus is configured to receive, through the wireless communication module, a third control instruction and first to-be-burned firmware transmitted by the terminal device, the third control instruction instructing, when a third target board is burned, writing the first to-be-burned firmware to the third target board through the peripheral interface connected to the third target board.

Optionally, in an embodiment of the present disclosure, the at least one burning apparatus includes a second burning apparatus; and the second burning apparatus is configured to receive, through the wireless communication module, a fourth control instruction and second to-be-burned firmware transmitted by the terminal device, the fourth control instruction instructing, when the burning of a fourth target board is suspended, suspending writing the second to-be-burned firmware to the fourth target board.

In the embodiments of the present disclosure, a burning apparatus is wirelessly connected to a terminal device through a wireless communication module, and to-be-burned firmware transmitted by the terminal device is received through the wireless communication module; the to-be-burned firmware is written to at least one target board through at least one peripheral interface, the to-be-burned firmware is transmitted to the burning apparatus through the terminal device by means of wireless transmission, and the burning apparatus is controlled to burn the target board, so the control is more flexible and the production efficiency is higher.

BRIEF DESCRIPTION OF THE DRAWINGS

Some specific embodiments of the present application are described in detail hereinafter in an exemplary manner instead of a non-limitative manner with reference to the accompanying drawings. In the drawings, like reference numerals denote like or similar parts or elements. A person skilled in the art should understand that these drawings are not necessarily drawn to scale. Among the drawings.

DETAILED DESCRIPTION

Specific implementations of the present disclosure are further described hereinafter with reference to the accompanying drawings of the embodiments of the present disclosure.

Embodiment 1

Figure 1:
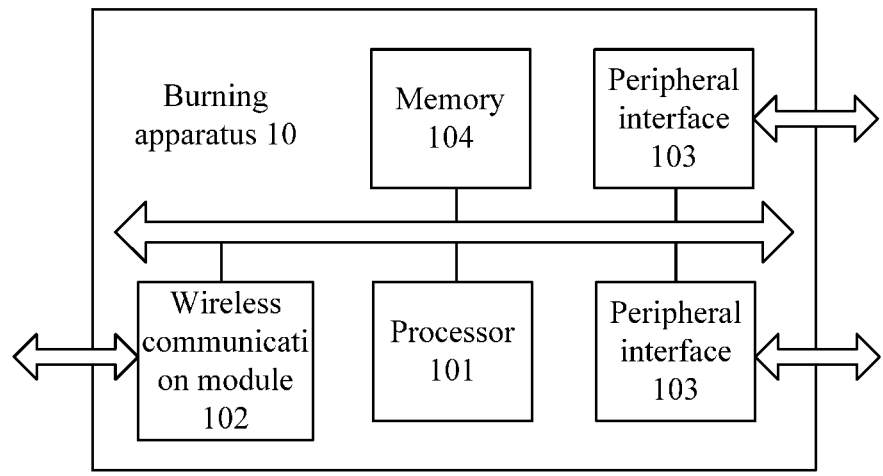
FIG. 1 is a structural diagram of a burning apparatus according to an embodiment of the present disclosure.

A first embodiment of the present disclosure provides a burning apparatus. As shown in FIG. 1, FIG. 1 is a structural diagram of a burning apparatus according to an embodiment of the present disclosure. The burning apparatus 10 includes: a processor 101, a wireless communication module 102, at least one peripheral interface 103, and a memory 104; the processor 101 is electrically connected to the wireless communication module 102, the peripheral interface 103, and the memory 104, respectively; the memory 104 is configured to store to-be-burned firmware and a system program required for operating the burning apparatus 10; the processor 101 is configured to start the system program to control the wireless communication module 102 to be wirelessly connected to a terminal device, and receive, through the wireless communication module 102, the to-be-burned firmware transmitted by the terminal device; and the processor 101 is also configured to be electrically connected to at least one target board through the at least one peripheral interface 103, and write the to-be-burned firmware to the at least one target board through the at least one peripheral interface 103.

In the present disclosure, the terminal device may be an electronic device having a wireless communication function, such as a smart phone or a tablet computer, and the specific form of the terminal device is not limited in the present disclosure. The target board is an empty board to which no program has been downloaded, the target board may be an IC (integrated circuit) board or a PCB (Printed Circuit Board), and the specific form of the target board is not limited in the present disclosure.

Figure 2:
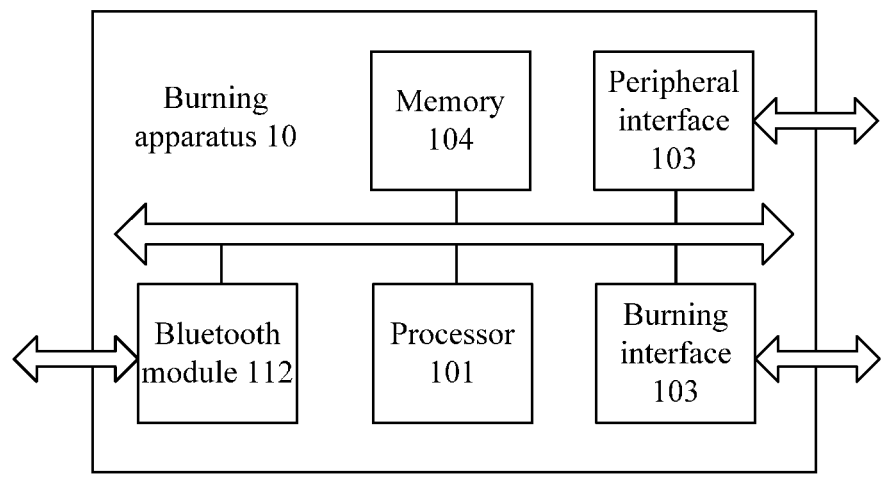
FIG. 2 is a structural diagram of a burning apparatus according to an embodiment of the present disclosure.

FIG. 2 is a structural diagram of a burning apparatus according to an embodiment of the present disclosure. The wireless communication module 102 will be described in detail with reference to FIG. 2. In the embodiment of the present disclosure, the wireless communication module 102 may include a wireless local area network module (for example, a wireless local area network card). The terminal device and the burning apparatus 10 may be connected to the same local area network, and the terminal device transmits a control instruction and/or to-be-burned firmware to the burning apparatus 10 through the local area network. The terminal device and the burning apparatus 10 may also be connected to a wide area network through the local area network, and the terminal device transmits a control instruction and/or to-be-burned firmware to the burning apparatus 10 through the local area network and the wide area network. The wireless communication module 102 may also include a wireless wide area network module (for example, a wireless wide area network card), and the terminal device transmits a control instruction and/or to-be-burned firmware to the burning apparatus 10 through the wide area network.

The wireless communication module 102 may also include a Bluetooth module 112 that utilizes wireless communication such as BLUETOOTH®, the terminal device and the burning apparatus 10 perform Bluetooth pairing, and the terminal device transmits a control instruction and/or to-be-burned firmware to the burning apparatus 10 through a Bluetooth connection.

In FIG. 2, the wireless communication module 102 includes the Bluetooth module 112 as an example. Optionally, the processor 101 is also configured to be connected to a Bluetooth module of the terminal device through the Bluetooth module 112, and the burning apparatus 10 receives, through the Bluetooth module 112, the to-be-burned firmware transmitted by the terminal device. The burning apparatus 10 and the terminal device are connected through Bluetooth, so that the quality and efficiency of data transmission are higher.

Optionally, in an embodiment of the present disclosure, the Bluetooth module 112 of the burning apparatus 10 may be connected to the Bluetooth module of the terminal device through BLE (Bluetooth Low Energy) technology, and the processor 101 is further configured to initialize a BLE protocol stack by starting the system program to enable BLE broadcasting, and connected to the Bluetooth module of the terminal device through the BLE broadcasting. Of course, BLE is only one way of Bluetooth connection, and does not indicate that the present disclosure is limited thereto.

Figure 3:
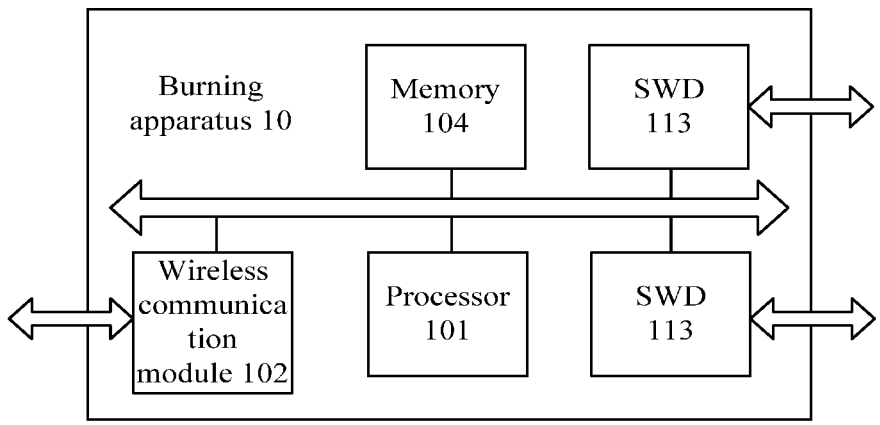
FIG. 3 is a structural diagram of a burning apparatus according to an embodiment of the present disclosure.

FIG. 3 is a structural diagram of a burning apparatus according to an embodiment of the present disclosure. At least one peripheral interface 103 will be described in detail with reference to FIG. 3.

Optionally, in an embodiment of the present disclosure, the at least one peripheral interface 103 includes at least one of the following interfaces: SWD (Serial Wire Debug) interface, SPI (Serial Peripheral Interface), I2C (Inter-Integrated Circuit) interface, IIS (Integrated Interchip Sound) interface, GPIO General-Purpose Input/Output) interface, and an interface with PWM (Pulse Width Modulation) capability.

Optionally, in an embodiment of the present disclosure, the at least one peripheral interface 103 includes an SWD 113, and the processor 101 is also configured to initialize the SWD 113 by starting the system program.

It should be noted that the processor 101 may be a micro-control core, or a CPU (Central Processing Unit), etc., which is not limited in the present disclosure. The memory 104 may include an SRAM (Static Random-Access Memory) and a Flash (Flash Electrically Erasable Programmable read only memory), where the SRAM can store a system program (a system program of the burning apparatus 10) required for operating the burning apparatus 10, while the Flash can store to-be-burned firmware, delete the to-be-burned firmware after a target board is burned, and store new to-be-burned firmware. Of course, here is only an exemplary description, and the memory 104 may also include other types of storage media, and is not limited to the SRAM and the Flash. The memory 104 may be integrated with the processor 101; the memory 104 and the processor 101 may also exist alone, and the processor 101 may be electrically connected to the memory 104 through a bus.

Generally, the storage space of the SRAM may be 256 KB (Kilobyte), and the storage space of the Flash may be 8 Mb (Mbits), because the Flash is usually used to store the to-be-burned firmware. If the data volume of the to-be-burned firmware exceeds 8 Mb, the to-be-burned firmware needs to be divided into multiple parts, and each part is burned in turn.

For example, in an embodiment of the present disclosure, the processor 101 is also configured to receive, through the wireless communication module 102, a first part of the to-be-burned firmware transmitted by the terminal device, store the first part of the to-be-burned firmware to the memory 104, and write the first part of the to-be-burned firmware to the at least one target board through the at least one peripheral interface 103; the processor 101 is also configured to delete, after finishing writing the first part of the to-be-burned firmware to the at least one target board, the first part of the to-be-burned firmware, receive, through the wireless communication module 102, a second part of the to-be-burned firmware transmitted by the terminal device, store the second part of the to-be-burned firmware to the memory 104, and write the second part of the to-be-burned firmware to the at least one target board through the at least one peripheral interface 103, till completely writing the to-be-burned firmware to the at least one target board.

In the present disclosure, because the burning apparatus 10 is wirelessly connected to the terminal device through the wireless communication module 102, a user can control the burning apparatus 10 in real time through the terminal device, and each of the at least one target board can be respectively controlled through the different peripheral interface 103 and the burning apparatus 10. Here are two specific examples for illustration:

Optionally, in a first example, the processor 101 is also configured to receive, through the wireless communication module 102, a first control instruction transmitted by the terminal device, the first control instruction being used to instruct burning of a first target board; and write, based on the first control instruction, the to-be-burned firmware to the first target board through the peripheral interface 103 connected to the first target board, the first target board belonging to the at least one target board.

Optionally, in a second example, the processor 101 is also configured to receive, through the wireless communication module 102, a second control instruction transmitted by the terminal device, the second control instruction being used to instruct suspending burning of a second target board; and suspend, based on the second control instruction, writing the to-be-burned firmware to the second target board, the second target board belonging to the at least one target board. Through the terminal device, the user can control the burning or suspend the burning of each target board and can also cancel the burning, and the burning apparatus 10 clears the burning firmware downloaded on the target board and cancels the burning of the target board.

It should be noted that the first example and the second example are just examples, indicating that the user can finely control the burning of each target board through the terminal device, and can send a plurality of first control instructions to instruct burning of a plurality of target boards, send a plurality of second control instructions to instruct suspending burning of the plurality of target boards, or send a plurality of first control instructions and a plurality of second control instructions at the same to instruct burning of a part of the target boards and instruct suspending burning of the other part of the target boards, and the specific control method is not limited in the present disclosure.

Optionally, in an embodiment of the present disclosure, the processor 101 is also configured to write, when determining the presence of to-be-burned firmware in the memory 104, the to-be-burned firmware to the at least one target board through the at least one peripheral interface 103. One peripheral interface 103 is connected to one target board, and the same to-be-burned firmware can be simultaneously written to the at least one target board through the at least one peripheral interface 103.

Optionally, in an embodiment of the present disclosure, the processor 101 is also configured to close the peripheral interface that has completed burning in the at least one peripheral interface 103.

Optionally, in an embodiment of the present disclosure, the processor 101 is also configured to write, when determining that the at least one peripheral interface 103 is connected to a target board, the to-be-burned firmware to the at least one target board through the at least one peripheral interface 103, otherwise, wait for connecting to a target board.

Compared with the conventional burning apparatus, the present disclosure wirelessly connects the burning apparatus with the terminal device based on the wireless communication module to get rid of a PC and a connection cable. An operator only needs to perform simple operations on the terminal device to complete various updates and settings of a burner, so the usage is more convenient and stable. In addition, the conventional burners, which support different versions of firmware, use large-capacity storage media, which leads to an increase in cost. However, the burners still have upper limits on storage capacity. Taking the terminal device being a smart phone as an example, with the popularization of smart phones, the capacity of common smart phones can reach a level of GB. Therefore, with the help of the capacity of smart phones, the limitation on the storage capacity of the burner can be thoroughly eliminated, and the cost of the burner is also greatly reduced. In addition, the conventional burning apparatus requires a touch display screen for human-computer interaction to display some common burning information. However, because the price of the touch display screen is relatively high, and often accounts for about 60% to 70% of the overall cost, which also results in a relatively high price of the conventional burning apparatus. The present disclosure transfers the human-computer interaction to a smart phone, so the cost of the burner is also greatly reduced. The present disclosure also provides a plurality of peripheral interfaces to achieve simultaneous burning of multiple channels, thereby doubling the production speed.

In the embodiment of the present disclosure, a burning apparatus is wirelessly connected to a terminal device through a wireless communication module, and to-be-burned firmware transmitted by the terminal device is received through the wireless communication module; the to-be-burned firmware is written to at least one target board through at least one peripheral interface, the to-be-burned firmware is transmitted to the burning apparatus through the terminal device by means of wireless transmission, and the burning apparatus is controlled to burn the target board, so the control is more flexible and the production efficiency is higher.

Embodiment 2

Figure 4:
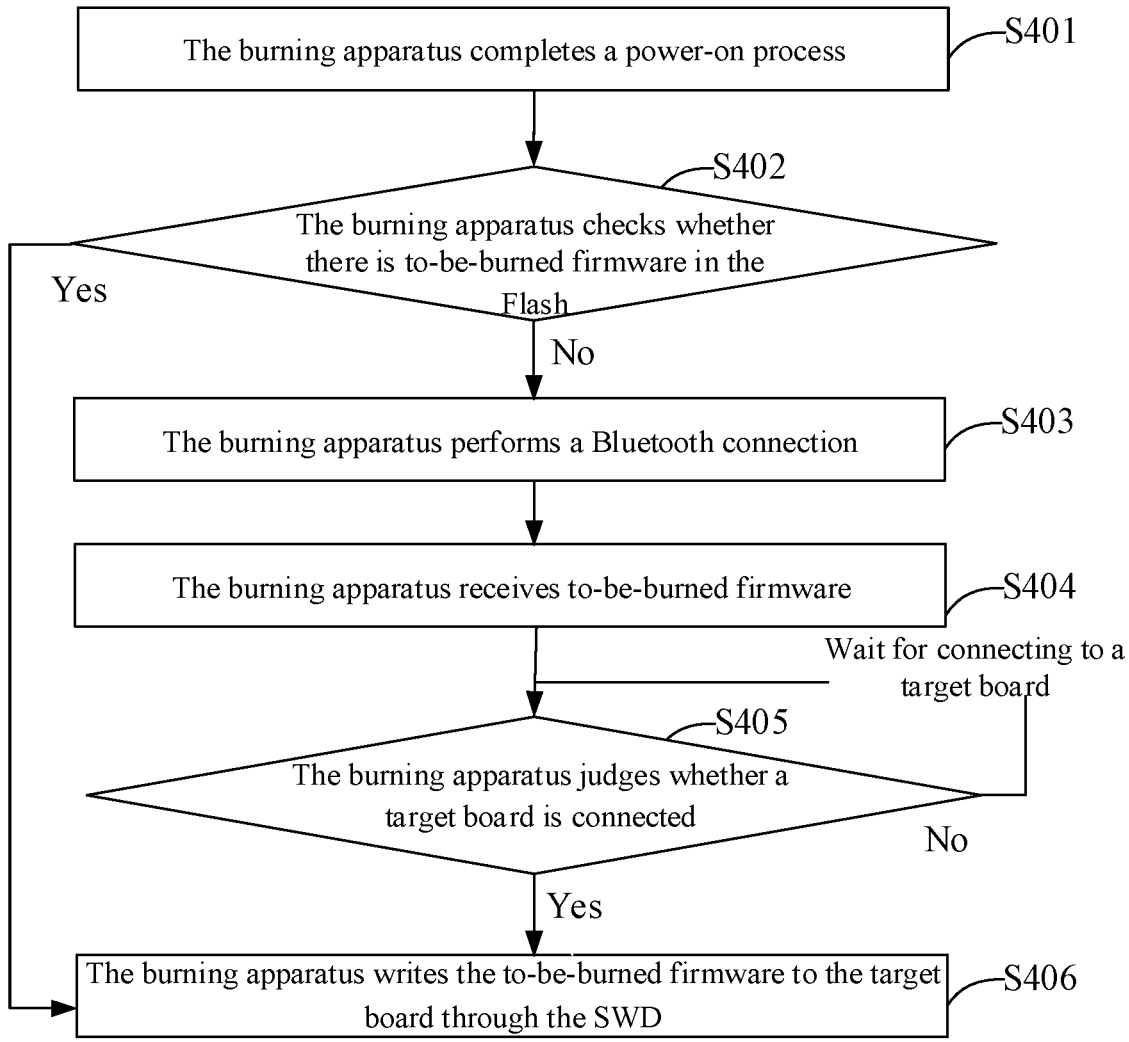
FIG. 4 is a flowchart of a burning method according to an embodiment of the present disclosure.

Based on the burning apparatus described in the first embodiment, the second embodiment of the present disclosure describes a burning method, which is applied to the burning apparatus described in the first embodiment. FIG. 4 is a flowchart of a burning method according to an embodiment of the present disclosure. As shown in FIG. 4, the present embodiment is described by an example that the wireless communication module includes a Bluetooth module, and the at least one peripheral interface is an SWD. The method includes the following steps:

S401, the burning apparatus completes a power-on process.

The power-on process may include loading a system program of the burning apparatus to initialize a BLE protocol stack, initialize the SWD, etc.

Figure 5:
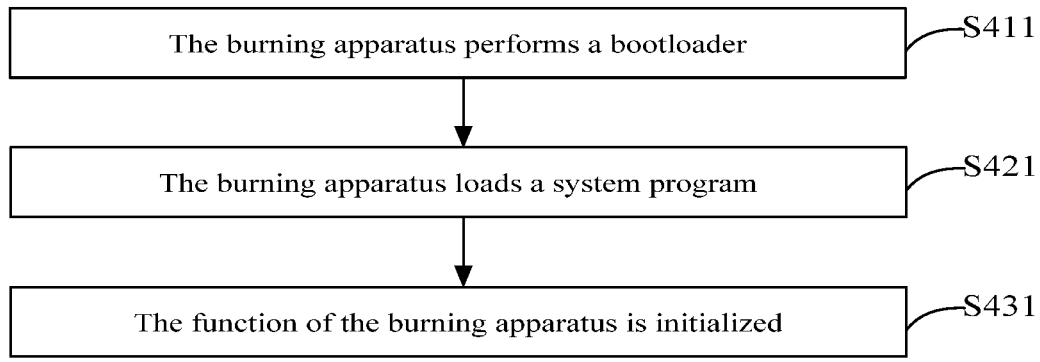
FIG. 5 is a flowchart of a power-on process of the burning apparatus according to an embodiment of the present disclosure.

Specifically, FIG. 5 is a flowchart of a power-on process of the burning apparatus according to an embodiment of the present disclosure. As shown in FIG. 5, the power-on process includes the following steps:

S411, the burning apparatus performs a bootloader.

The bootloader stage mainly includes a minimum configuration content required for system boot, including initialization of a system running clock, C running stack, data area copy, Flash running initialization, etc.

S421, the burning apparatus loads a system program.

The system program may be loaded by calling a SYSTEM_INIT function, and this stage mainly includes initialization of a BLE protocol stack and configuration of a PWR (power control) power management mode.

S431, the function of the burning apparatus is initialized.

The function is initialized by calling an APP_INIT function, and this stage mainly includes initialization of an SWD, setting of broadcasting parameters, and enabling of BLE broadcasting to connect with the Bluetooth module of the terminal device.

After the power-on process is over, a target board can be burned.

S402, the burning apparatus checks whether there is to-be-burned firmware in the Flash.

The burning apparatus checks whether there is to-be-burned firmware in the flash, if there is, S405 is performed, and if there is not, S403 is performed.

S403, the burning apparatus performs a Bluetooth connection.

Figure 6:
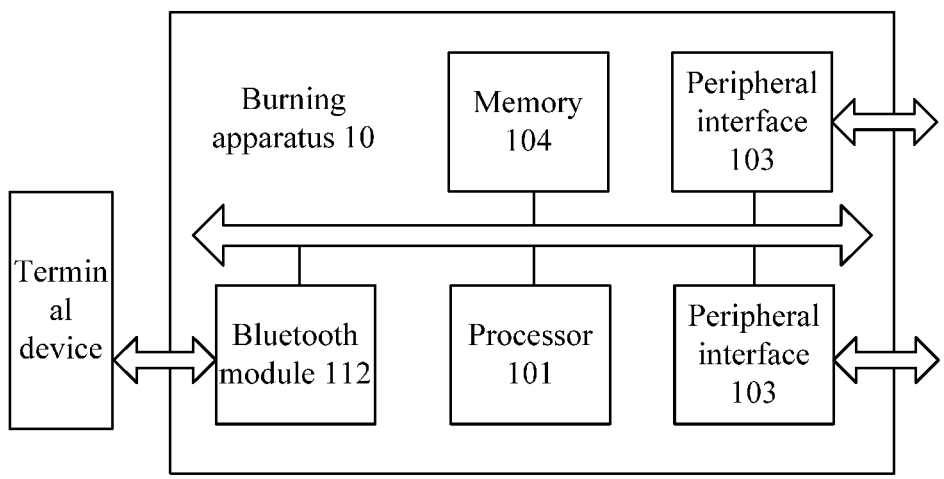
FIG. 6 is a schematic diagram of a Bluetooth connection according to an embodiment of the present disclosure.

FIG. 6 is a schematic diagram of a Bluetooth connection according to an embodiment of the present disclosure. As shown in FIG. 6, the burning apparatus performs Bluetooth broadcasting and waits for the terminal device to initiate a connection. After the Bluetooth connection succeeds, the burning apparatus enters a wait command mode and waits for the terminal device to transmit to-be-burned firmware.

S404, the burning apparatus receives to-be-burned firmware.

When receiving a download command transmitted by the terminal device, the burning apparatus receives the to-be-burned firmware transmitted by the terminal device, and then stores the to-be-burned firmware to the local Flash for next burning.

S405, the burning apparatus judges whether a target board is connected.

Figure 7:
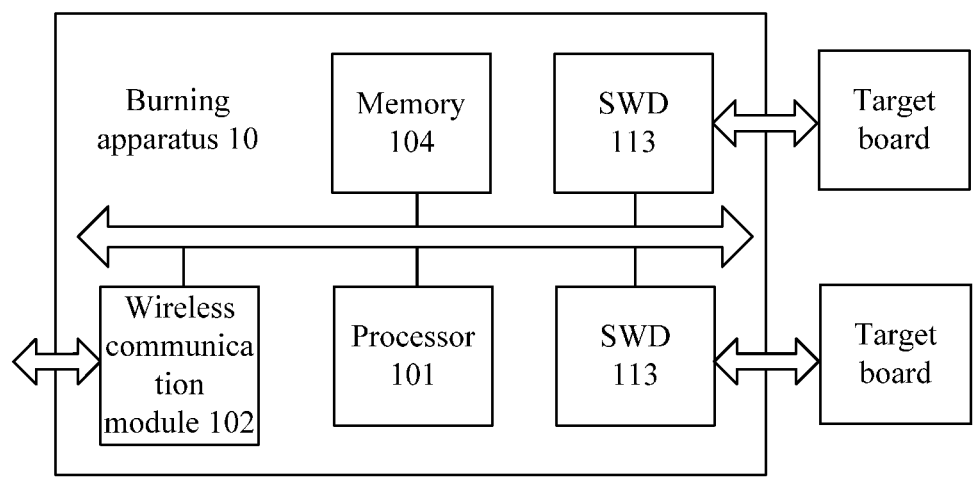
FIG. 7 is a schematic diagram of a target board connection according to an embodiment of the present disclosure.

FIG. 7 is a schematic diagram of a target board connection according to an embodiment of the present disclosure. As shown in FIG. 7, whether a target board is connected is judged, and if so, S406 is performed, otherwise, the burning apparatus enters a state of waiting for a connection to a target board, and after the target board is connected, S406 is performed.

S406, the burning apparatus writes the to-be-burned firmware to the target board through the SWD.

It should be noted that if the burning apparatus is connected to N target boards (N is an integer more than 1, N may be equal to 4 or 8, of course, N may also be other integers more than 1, and N is the number of target boards simultaneously connected to the burning apparatus), the burning apparatus performs multi-channel burning.

Figure 8:
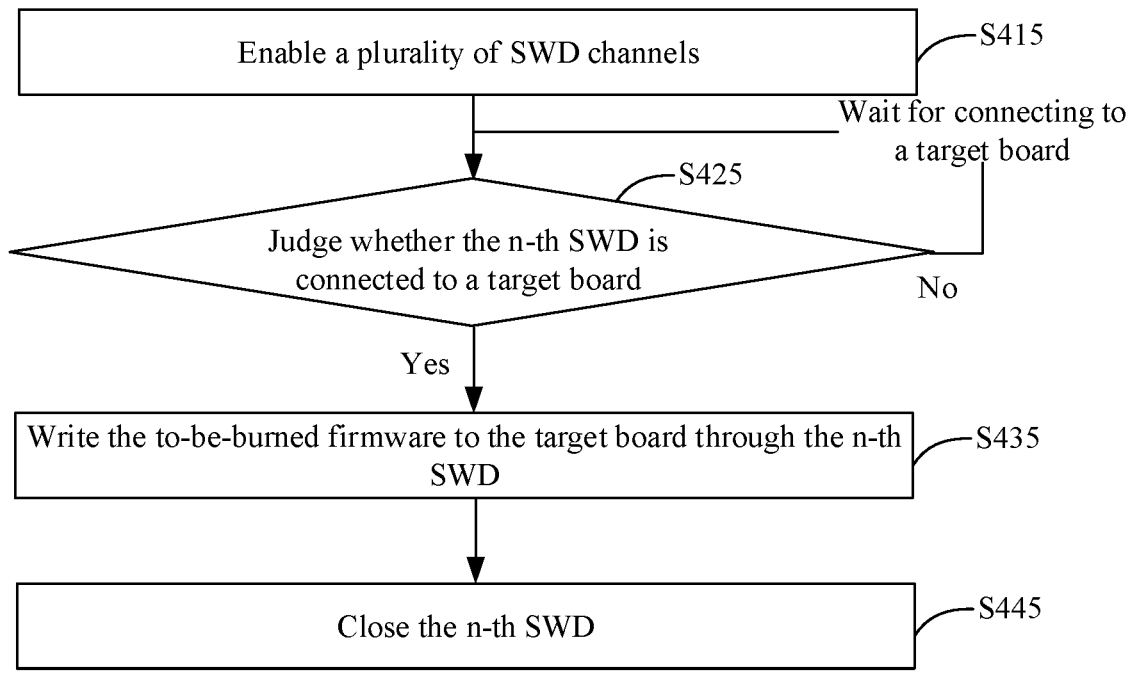
FIG. 8 is a flowchart of multi-channel burning according to an embodiment of the present disclosure.

Specifically, FIG. 8 is a flowchart of multi-channel burning according to an embodiment of the present disclosure. As shown in FIG. 8, the multi-channel burning includes the following steps:

S415, a plurality of SWD channels are enabled.

One SWD corresponds to one SWD channel, and a plurality of target boards can be burned simultaneously through a plurality of SWDs. For example, 4 channels may be enabled by default, and at most 8 channels may be enabled.

S425, whether the n-th SWD is connected to a target board is judged.

n is an integer within [1, N]. After each SWD channel is enabled, the burning apparatus checks in real time whether a target board is connected. If the n-th SWD is connected to a target board, S435 is performed. If the n-th SWD is not connected to a target board, the waiting of a connection continues.

S435, the to-be-burned firmware is written to the target board through the n-th SWD.

S445, the n-th SWD is closed.

After the downloading of each SWD channel is completed, the SWD is closed to wait for next execution.

Embodiment 3

Figure 9:
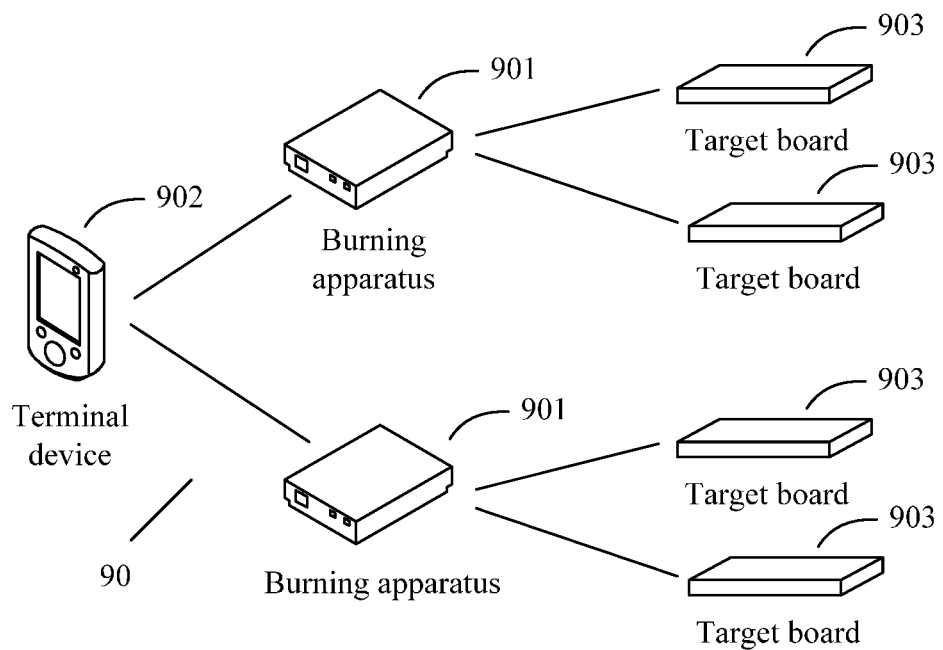
FIG. 9 is a structural diagram of a burning system according to an embodiment of the present disclosure.

Based on the burning apparatus provided by the first embodiment of the present disclosure, a third embodiment of the present disclosure provides a burning system. As shown in FIG. 9, FIG. 9 is a structural diagram of a burning system according to an embodiment of the present disclosure. The burning system 90 includes: at least one burning apparatus 901, a terminal device 902, and at least one target board 903; the at least one burning apparatus 901 is the burning apparatus 10 described in the first embodiment; the terminal device 902 is wirelessly connected to the at least one burning apparatus 901, and each burning apparatus 901 is connected to at least one target board 903 through at least one peripheral interface; the terminal device 902 is configured to transmit at least one to-be-burned firmware to the at least one burning apparatus 901; the at least one burning apparatus 901 is configured to receive, through a respective wireless communication module, the to-be-burned firmware transmitted by the terminal device 902, and the to-be-burned firmware received by the burning apparatus 901 is the same or different; and the at least one burning apparatus 901 is also configured to write the respective received to-be-burned firmware to the respective connected at least one target board 903 through the respective at least one peripheral interface.

The terminal device 902 may be connected to a plurality of burning apparatuses 901, and controls each burning apparatus 901 differently. Here, two application scenarios are listed as follows:

Optionally, in a first application scenario, the at least one burning apparatus 901 includes a first burning apparatus 901; and the first burning apparatus 901 is configured to receive, through the wireless communication module, a third control instruction and first to-be-burned firmware transmitted by the terminal device 902, the third control instruction instructing, when a third target board 903 is burned, writing the first to-be-burned firmware to the third target board 903 through the peripheral interface connected to the third target board 903.

Optionally, in a second application scenario, the at least one burning apparatus 901 includes a second burning apparatus 901; and the second burning apparatus 901 is configured to receive, through the wireless communication module, a fourth control instruction and second to-be-burned firmware transmitted by the terminal device 902, the fourth control instruction instructing, when the burning of a fourth target board 903 is suspended, suspending writing the second to-be-burned firmware to the fourth target board 903.

In the embodiment of the present disclosure, a burning apparatus is wirelessly connected to a terminal device through a wireless communication module, and to-be-burned firmware transmitted by the terminal device is received through the wireless communication module; the to-be-burned firmware is written to at least one target board through at least one peripheral interface, the to-be-burned firmware is transmitted to the burning apparatus through the terminal device by means of wireless transmission, and the burning apparatus is controlled to burn the target board, so the control is more flexible and the production efficiency is higher.

The terminal device in the embodiments of the present disclosure exists in multiple forms, including but not limited to:

(1) A mobile communication device: This type of device has a mobile communication function, and has a main goal of providing voice and data communication. This type of terminal includes: a smart phone (such as iPhone), a multimedia phone, a functional phone, a low-end phone, etc.

(2) An ultra-mobile personal computer device: This type of device belongs to the category of personal computers, has computing and processing functions, and generally has mobile Internet access characteristics. This type of terminal includes: PDA, MID and UMPC devices, such as iPad.

(3) A portable entertainment device: This type of device can display and play multimedia contents. This type of device includes: an audio and video player (such as iPod), a hand-held game console, an e-book, as well as an intelligent toy and a portable vehicle navigation device.

(4) Other electronic devices having data interaction functions.

So far, specific embodiments of the present subject matter have been described. Other embodiments fall within the scope of the appended claims. In some cases, the operations described in the claims may be performed in a different order and still achieve the desired results. In addition, the processes described in the drawings do not necessarily require a particular order shown or a sequential order to achieve the desired results. In some embodiments, multitasking and parallel processing may be advantageous.

In the 1990s, for a technical improvement, it can be clearly distinguished to be an improvement on hardware (for example, an improvement on a circuit structure such as a diode, a transistor, or a switch) or an improvement on software (an improvement on a method flow). However, with the development of technology, today's improvements of many methods and processes can be regarded as direct improvements of hardware circuit structures. Designers almost get the corresponding hardware circuit structures by programming the improved method flows into hardware circuits. Therefore, it cannot be said that the improvement of a method flow cannot be implemented by hardware entity modules. For example, a Programmable Logic Device (PLD) (such as a Field Programmable Gate Array (FPGA))

is such an integrated circuit whose logic function is determined by user's programming on the device. A designer can program by himself to "integrate" a digital system onto a PLD, without asking a chip manufacturer to design and manufacture a dedicated integrated circuit chip. Moreover, nowadays, instead of manufacturing the integrated circuit chip manually, this programming is mostly implemented by "logic compiler" software, which is similar to a software compiler used in program development and writing, but the original code before compiling has to be written in a specific programming language which is called a Hardware Description Language (HDL). There is not only one kind of HDL, but many types, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., while VHDL (Very-High-Speed Integrated Circuit Hardware Description Language) and Verilog are the most commonly used. Those skilled in the art should also be clear that as long as the method flow is slightly logically programmed and integrated into an integrated circuit by using the above-mentioned several hardware description languages, a hardware circuit that implements the logic method flow can be easily obtained.

The controller may be implemented in any suitable manner, for example, the controller may be in the form of a microprocessor or a processor as well as a computer-readable medium storing computer-readable program codes (such as software or firmware) executable by the (micro) processor, a logic gate, a switch, an Application Specific Integrated Circuit (ASIC), a programmable logic controller and an embedded microcontroller. Examples of the controller include but are not limited to the following microcontrollers: ARC 625D, Atmel AT91SAM, Microchip PIC18F26K20 and Silicone Labs C8051F320, and the memory controller may also be implemented as part of a control logic of a memory. Those skilled in the art also know that, in addition to implementing the controller in a purely computer-readable program code manner, the method steps may also be logically programmed at all such that the controller implements the same functions in the form of a logic gate, a switch, an ASIC, a programmable logic controller, an embedded microcontroller or the like. Therefore, such a controller may be regarded as a hardware component, and an apparatus included in the controller for implementing various functions may also be regarded as a structure within the hardware component. Or even, the apparatus for implementing various functions may be regarded as a software module implementing the method or a structure within the hardware component.

The systems, apparatuses, modules or units illustrated in the above embodiments may be implemented by a computer chip, an entity, or a product having certain function. A typical implementation device is a computer. Specifically, the computer may be, for example, a personal computer, a laptop computer, a cellular phone, a camera phone, a smart phone, a personal digital assistant, a media player, a navigation device, an E-mail device, a game console, a tablet computer, a wearable device, or a combination of any of these devices.

For the convenience of description, when the above apparatus is described, the functions may be described by various units respectively. Of course, when the present disclosure is implemented, the functions of respective units may be implemented in the same or more software and/or hardware.

A person skilled in the art should understand that the embodiments of the present disclosure may be provided as a method, a system, or a computer program product. Therefore, the present disclosure may be in the form of a full hardware embodiment, a full software embodiment, or an embodiment combining software and hardware. In addition, the present disclosure may be in the form of a computer program product implemented on one or more computer available storage media (including but not limited to a disk memory, a CD-ROM, an optical memory, etc.) including computer available program codes.

The present disclosure is described with reference to flowcharts and/or block diagrams of the method, device (system), and the computer program product in the embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of other programmable data processing device to generate a machine, so that a device configured to implement functions specified in one or more processes in the flowcharts and/or one or more blocks in the block diagrams is generated by using instructions executed by the general-purpose computer or the processor of other programmable data processing device.

These computer program instructions may also be stored in a computer-readable memory that can guide a computer or other programmable data processing device to work in a specific manner, so that the instructions stored in the computer-readable memory generate a product including an instruction device, where the instruction device implements functions specified in one or more processes in the flowcharts and/or one or more blocks in the block diagrams.

These computer program instructions may also be loaded into a computer or other programmable data processing device, so that a series of operation steps are performed on the computer or other programmable data processing device to generate processing implemented by a computer, and instructions executed on the computer or other programmable data processing device provide steps for implementing functions specified in one or more processes in the flowcharts and/or one or more blocks in the block diagrams.

In a typical configuration, a computing device includes one or more central processing units (CPUs), an input/output interface, a network interface and a memory.

The memory may be in the form of a volatile memory, a random access memory (RAM) and/or a non-volatile memory, such as a read-only memory (ROM) or a flash RAM, in a computer-readable medium. The memory is an example of the computer-readable medium.

The computer-readable medium, including permanent and non-permanent, mobile and immobile media, may store information by any method or technology. The information may be computer-readable instructions, data structures, modules of programs or other data. The examples of storage media for a computer include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a read-only disk read-only memory (CD-ROM), a digital versatile disc (DVD) or other optical storage, a magnetic cartridge tape, a tape disk storage or other magnetic storage device or any other non-transportable media, which can be used for storing information that can be accessed by a computing device. As defined herein, the computer-readable medium does not include computer-readable transitory media, such as modulated data signals and carriers.

It should be noted that the terms "include", "comprise", or any variants thereof are intended to cover a non-exclusive inclusion. Accordingly, a process, method, commodity, or device including a series of elements not only includes these elements, but also includes other elements not definitely listed, or may include inherent elements of the process, method, commodity, or device. In the absence of more limitations, an element limited by "include a . . . " does not exclude other same elements existing in the process, method, commodity, or device including the element.

A person skilled in the art should understand that the embodiments of the present disclosure may be provided as a method, a system, or a computer program product. Therefore, the present disclosure may be in the form of a full hardware embodiment, a full software embodiment, or an embodiment combining software and hardware. In addition, the present disclosure may be in the form of a computer program product implemented on one or more computer available storage media (including but not limited to a disk memory, a CD-ROM, an optical memory, etc.) including computer available program codes.

The present disclosure may be described in a general context of a computer executable instruction executed by the computer, for example, a program module. Generally, the program module includes a routine, a program, an object, a component, a data structure, and the like for performing a specific task or implementing a specific abstract data type. The present disclosure may also be practiced in distributed computing environments. In these distributed computing environments, a task is performed by a remote processing device connected by a communications network. In the distributed computing environments, the program module may be in local and remote computer storage media that include a storage device.

Each embodiment in the Description is described in a progressive manner, the same or similar parts between the various embodiments may refer to each other, and each embodiment focuses on the differences from other embodiments. Particularly, the system embodiments are substantially similar to the method embodiments and therefore are briefly described, and reference may be made to the method embodiments for the related parts.

Described above are merely embodiments of the present disclosure, and the present disclosure is not limited thereto. Various modifications and variations may be made to the present disclosure for those skilled in the art. Any modification, equivalent substitution, improvement or the like made within the spirit and principle of the present disclosure shall fall into the scope of the claims of the present disclosure.

What is claimed is:

1. A burning apparatus, comprising: a processor, a wireless communication module, at least one peripheral interface, and a memory; wherein, the processor is electrically connected to the wireless communication module, the at least one peripheral interface, and the memory respectively;

the memory is configured to store to-be-burned firmware and a system program required for operating the burning apparatus;

the processor is configured to start the system program to control the wireless communication module to be wirelessly connected to a terminal device, and receive, through the wireless communication module, the to-be-burned firmware transmitted by the terminal device; and the processor is configured to be electrically connected to at least one target board through the at least one peripheral interface, and write the to-be-burned firmware to the at least one target board through the at least one peripheral interface;

the processor is also configured to receive, through the wireless communication module, a first part of the to-be-burned firmware transmitted by the terminal device, store the first part of the to-be-burned firmware to the memory, and write the first part of the to-be-burned firmware to the at least one target board through the at least one peripheral interface; and the processor is also configured to delete, after finishing writing the first part of the to-be-burned firmware to the at least one target board, the first part of the to-be-burned firmware, receive, through the wireless communication module, a second part of the to-be-burned firmware transmitted by the terminal device, store the second part of the to-be-burned firmware to the memory, and write the second part of the to-be-burned firmware to the at least one target board through the at least one peripheral interface, until an entirety of the to-be-burned firmware is written to the at least one target board.

2. The apparatus according to claim 1, wherein the wireless communication module comprises a Bluetooth module; and the processor is further configured to be in Bluetooth connection with the terminal device through the Bluetooth module, and receive, through the Bluetooth module, the to-be-burned firmware transmitted by the terminal device.

3. The apparatus according to claim 2, wherein the processor is further configured to initialize a BLE (Bluetooth Low Energy) protocol stack by starting the system program to enable BLE broadcasting, and is in Bluetooth connection with the terminal device through the BLE broadcasting.

4. The apparatus according to claim 1, wherein the at least one peripheral interface comprises at least one of the following interfaces: SWD (Serial Wire Debug) interface, SPI (Serial Peripheral Interface), I2C (Inter-Integrated Circuit) interface, IIS (Integrated Interchip Sound) interface, GPIO (General-Purpose Input/Output) interface, and an interface with PWM (Pulse Width Modulation) capability.

5. The apparatus according to claim 1, wherein the at least one peripheral interface comprises an SWD a Serial Wire Debug (SWD) interface, and the processor is further configured to initialize the SWD interface by starting the system program.

6. The apparatus according to claim 1, wherein the processor is also configured to receive, through the wireless communication module, a first control instruction transmitted by the terminal device, and write, based on the first control instruction, the to-be-burned firmware to a first target board through the peripheral interface connected to the first target board, the first target board belonging to the at least one target board.

7. The apparatus according to claim 1, wherein the processor is also configured to receive, through the wireless communication module, a second control instruction transmitted by the terminal device, and suspend, based on the second control instruction, writing the to-be-burned firmware to a second target board, the second target board belonging to the at least one target board.

8. The apparatus according to claim 1, wherein the processor is also configured to write, when determining the presence of to-be-burned firmware in the memory, the to-be-burned firmware to the at least one target board through the at least one peripheral interface.

9. The apparatus according to claim 1, wherein the processor is also configured to close an interface that has completed burning in the at least one peripheral interface.

10. The apparatus according to claim 1, wherein the processor is also configured to write, when determining that the at least one peripheral interface is connected to a target board, the to-be-burned firmware to the at least one target board through the at least one peripheral interface, otherwise, wait for connecting to a target board.

11. A burning system, comprising: at least one burning apparatus according to claim 1, a terminal device, and at least one target board; wherein, the terminal device is wirelessly connected to the at least one burning apparatus, and each burning apparatus is connected to at least one target board through at least one peripheral interface;

the terminal device is configured to transmit at least one to-be-burned firmware to the at least one burning apparatus;

the at least one burning apparatus is configured to receive, through a respective wireless communication module, the to-be-burned firmware transmitted by the terminal device, and when there are two or more burning apparatus, the to-be-burned firmware received by the two or more burning apparatus is the same or different; and the at least one burning apparatus is also configured to write the respective received to-be-burned firmware to the respective connected at least one target board through the respective at least one peripheral interface.

12. The system according to claim 11, wherein the at least one burning apparatus comprises a first burning apparatus; and the first burning apparatus is configured to receive, through the wireless communication module, a third control instruction and first to-be-burned firmware transmitted by the terminal device, the third control instruction instructing, when a third target board is burned, writing the first to-be-burned firmware to the third target board through a peripheral interface connected to the third target board.

13. The system according to claim 11, wherein the at least one burning apparatus comprises a second burning apparatus; and the second burning apparatus is configured to receive, through the wireless communication module, a fourth control instruction and second to-be-burned firmware transmitted by the terminal device, the fourth control instruction instructing, when the burning of a fourth target board is suspended, suspending writing the second to-be- burned firmware to the fourth target board.

* * * * *